Patented Jan. 28, 1936

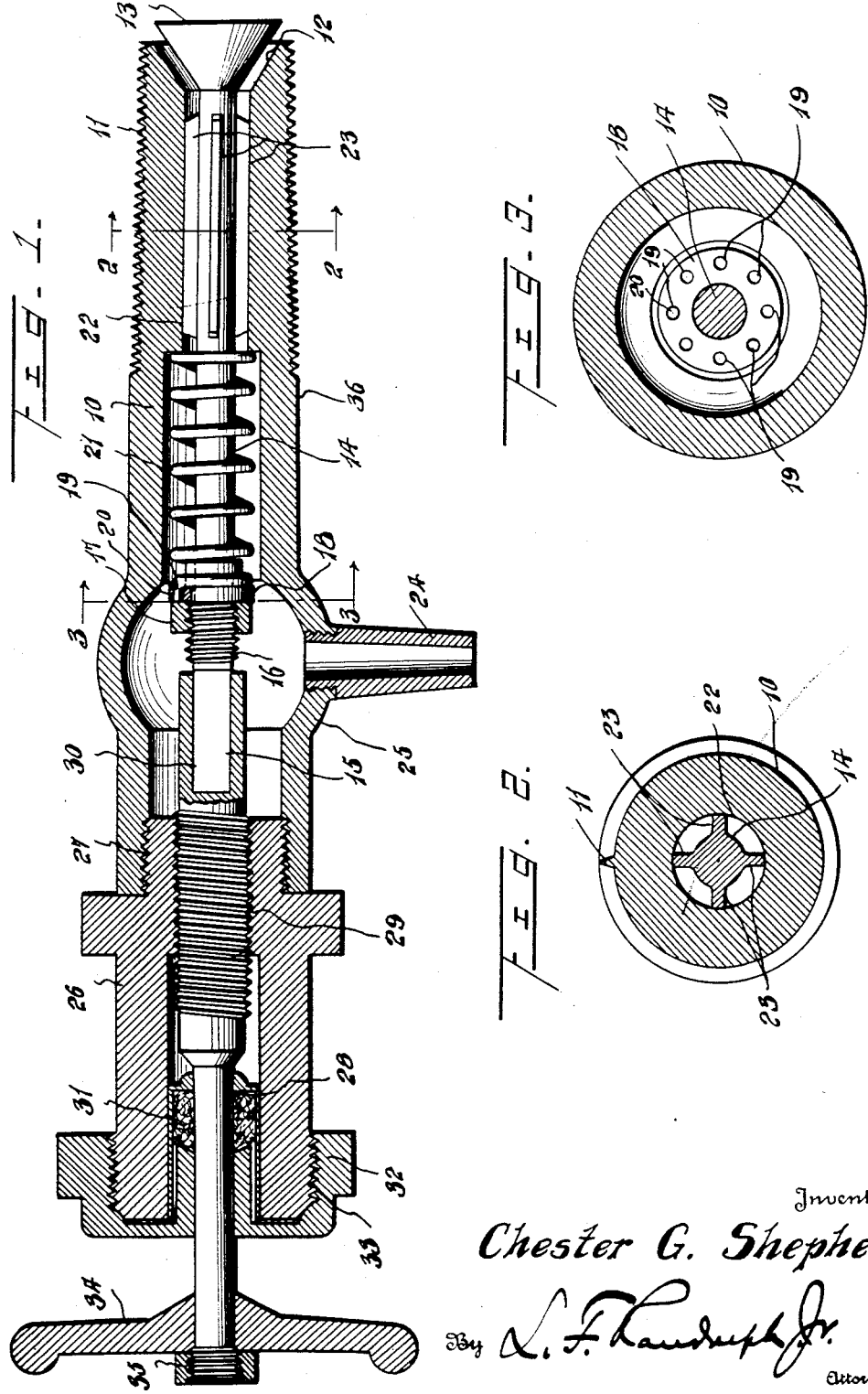

2,029,202

UNITED STATES PATENT OFFICE 2,029,202

HIGH PRESSURE SAFETY GAUGE COCK

Chester G. Shepherd, Freeport, Ill.

Application August 28, 1935, Serial No. 38,271

2 Claims. (Cl. 251—29)

This invention relates to a high pressure safety gauge cock or valve and it generally aims to provide one of the self-cleaning type primarily adapted for use where high pressure is maintained, for instance in locomotive and marine engine and other steam boilers.

It is generally aimed to improve a construction or device of this character so that the valve will not likely be displaced or opened upon fracture of the valve body; wherein the packing feature is improved, wherein the valve is self-seating and wherein the outer part of the valve stem is removable without removing the inner part.

Various additional objects and advantages will become apaparent from a consideration of the description following taken in connection with accompanying drawing illustrating an operative embodiment.

In said drawing:—

Figure 1 is a view of the improved valve in central longitudinal section;

Figure 2 is a cross section taken on the line 2—2 of Figure 1, and

Figure 3 is a cross section taken on the line 3—3 of Figure 1.

Referring specifically to the drawing, wherein like reference characters designate like or corresponding parts, 10 designates a hollow casing or body adapted to be screwed at 11, into a steam boiler or the like. At the inlet to the bore of the body 10, the same is beveled as at 12 to form a seat for a conical valve 13, the latter being wider than the narrowest portion of the seat so that it cannot be blown outwardly through the bore in case of breakage of the parts.

Said valve 13 is carried by a stem section 14 whose outer end is square or otherwise polygonal at 15. Below such end 15, stem section 14 has screw-threads 16 adjustably engaged by a nut 17 against which a follower 18 bears. Follower 18 is turnable and slidable on the stem section 14 and has a plurality of recesses 19 therethrough into any of which the free end 20 of an expansive coil spring 21 is entered. Such spring 21 surrounds the stem portion 14 and abuts a shoulder 22 within the bore, whereby the tendency of the spring 21 is to urge the valve 13 against its seat 12.

Between the valve head 13 and the spring 21, any suitable number of vanes or ribs 28 are provided, for instance, four, which engage the adjacent bore wall and serve to ream or scrape the same of foreign matter which collects thereon. Such vanes 23 also serve to guide the valve stem section 14 in its operation.

The waste pipe or drain from the body 10 is shown at 24 and it preferably leads from an enlarged or globular portion of said body.

To the outer end of the body 10, a bonnet 26 is detachably secured by right hand screw-threads as at 27, and it has a valve stem section 28 screw-threaded therein, preferably by left hand screw-threads, at 29. The inner end of said stem section 28 is in the form of a socket 30 interiorly conforming to the external shape of the polygonal portion 15 so that the turning of the stem section 28 will also turn the stem section 14. When the bonnet 26 is detached, the socket 20 will likewise be detached from the polygonal portion 15 of stem section 14.

At the outer end, the bore of the bonnet 26 has suitable packing 31 therein about the stem section 28 and such packing is relieved of and not subject to the pressure within the boiler, in view of the closed joint afforded by the screw-thread connection at 29. A screw cap 32 secures the packing 31 in place and guides the stem section 28, being screw-threaded as at 33 to the bonnet. Said stem section 28 is operable by a hand wheel or the equivalent 34 detachably secured as by a nut or in any other suitable manner to the stem section 28.

It will be realized that the valve seat 12 and valve 13 may be reground without removing the same from the boiler, sufficient access being had thereto when the bonnet 26 and valve stem section 28 are removed.

The body 10 at a suitable portion thereof, for instance as at 36, is preferably square or otherwise polygonal to facilitate engagement by a wrench.

Various changes may be resorted to provided they fall within the spirit and scope of the invention.

What is claimed is:—

1. A safety gauge cock of the class described, comprising a body having its bore at the attaching end provided with a beveled valve seat, a conical valve for engaging said seat, vanes to ream the bore of the body above said seat, a stem section from which the vanes extend and carrying said valve, an adjustable abutment on said stem, an abutment interiorly of said body, an expansive spring engaging said abutments and urging the valve to its seat, a bonnet screw-threaded to said body, a valve stem section screw-threaded in the bonnet, and separable coupling means between the valve stem sections.

2. A safety gauge cock of the class described, comprising a body having its bore at the attaching end provided with a beveled valve seat, a conical valve for engaging said seat, vanes to ream the bore of the body above said seat, a stem section from which the vanes extend and carrying said valve, an adjustable abutment on said stem, an abutment interiorly of said body, an expansive spring engaging said abutments and urging the valve to its seat, a bonnet screw-threaded to said body, a valve stem section screw-threaded in the bonnet, separable coupling means between the valve stem sections, packing about the valve stem section within the bonnet, and a cap on the bonnet securing said packing in place, said body being enlarged adjacent said separable coupling means, and an outlet means for the body at said enlargement.

CHESTER G. SHEPHERD.